US011098680B2

(12) United States Patent
Asai

(10) Patent No.: US 11,098,680 B2
(45) Date of Patent: Aug. 24, 2021

(54) INTERNAL COMBUSTION ENGINE

(71) Applicant: Yanmar Co., Ltd., Osaka (JP)

(72) Inventor: Go Asai, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 16/647,463

(22) PCT Filed: Sep. 10, 2018

(86) PCT No.: PCT/JP2018/033376
§ 371 (c)(1),
(2) Date: Mar. 13, 2020

(87) PCT Pub. No.: WO2019/059014
PCT Pub. Date: Mar. 28, 2019

(65) Prior Publication Data
US 2020/0217279 A1 Jul. 9, 2020

(30) Foreign Application Priority Data
Sep. 21, 2017 (JP) .............................. JP2017-181203

(51) Int. Cl.
F02M 26/36 (2016.01)
F02D 19/02 (2006.01)
(Continued)

(52) U.S. Cl.
CPC .............. F02M 26/36 (2016.02); F02D 19/02 (2013.01); F02D 19/0671 (2013.01);
(Continued)

(58) Field of Classification Search
CPC ........ F02M 26/05; F02M 26/35; F02M 26/36; F02M 26/43; F02M 27/02; F02D 19/0671; F02D 21/08
See application file for complete search history.

(56) References Cited

U.S. PATENT DOCUMENTS 4,735,186 A * 4/1988 Parsons ..................... F02B 1/10
123/3
6,397,790 B1 * 6/2002 Collier, Jr. .............. F02B 43/00
123/3
(Continued)

FOREIGN PATENT DOCUMENTS

DE 102012204649 A1 * 9/2013 ............. F02M 25/12
EP 2639441 A1 * 9/2013 ............. F02B 47/08
(Continued)

OTHER PUBLICATIONS

International Search Report dated Nov. 27, 2018 issued in corresponding PCT Application PCT/JP2018/033376.

Primary Examiner — John M Zaleskas
(74) Attorney, Agent, or Firm — Norton Rose Fulbright US LLP

(57) ABSTRACT

An internal combustion engine including a fuel reformation unit that generates reformed fuel based on liquid fuel and higher in octane rating than the liquid fuel and introduces the generated reformed fuel to an output cylinder. The fuel reformation unit includes a first fuel reformer that includes a reciprocal mechanism where a piston reciprocates in a cylinder, a second fuel reformer that includes a reformation catalyst, and a reformed gas passage that connects the first and second fuel reformers together. First reformed gas discharged from the first fuel reformer is introduced to the second fuel reformer through the reformed gas passage.

18 Claims, 3 Drawing Sheets

(51) Int. Cl.
*F02D 19/06* (2006.01)
*F02D 21/08* (2006.01)
*F02B 29/04* (2006.01)
*F02M 27/02* (2006.01)

(52) U.S. Cl.
CPC .......... *F02D 21/08* (2013.01); *F02B 29/0406* (2013.01); *F02M 27/02* (2013.01)

(56) References Cited

U.S. PATENT DOCUMENTS

| | | | | |
|---|---|---|---|---|
| 6,508,209 B1* | 1/2003 | Collier, Jr. | ............. | F02B 43/00 123/3 |
| 2005/0081514 A1* | 4/2005 | Nakada | ............. | F02M 26/36 60/286 |
| 2008/0295501 A1* | 12/2008 | Gong | ............. | F02M 26/15 60/299 |
| 2010/0212611 A1* | 8/2010 | Yahagi | ............. | F02M 25/12 123/3 |
| 2010/0300382 A1* | 12/2010 | Yahagi | ............. | F01N 5/02 123/3 |
| 2011/0160984 A1* | 6/2011 | Inoue | ............. | F02D 41/1441 701/108 |
| 2012/0204844 A1* | 8/2012 | Gingrich | ............. | F02M 26/43 123/568.11 |
| 2012/0204845 A1* | 8/2012 | Gingrich | ............. | F02M 26/05 123/568.17 |
| 2013/0220286 A1* | 8/2013 | Gingrich | ............. | F02M 26/35 123/568.11 |
| 2013/0239547 A1* | 9/2013 | Gingrich | ............. | F02M 26/19 60/274 |
| 2013/0333639 A1* | 12/2013 | Hoshino | ............. | F02M 26/35 123/3 |
| 2014/0069082 A1* | 3/2014 | Alger, II | ............. | F02B 47/08 60/274 |
| 2014/0196697 A1* | 7/2014 | Burrahm | ............. | F02M 26/43 123/568.11 |
| 2014/0196702 A1* | 7/2014 | Gingrich | ............. | F02D 41/0025 123/568.21 |
| 2014/0305416 A1* | 10/2014 | Gukelberger | ............. | F02M 26/05 123/568.21 |
| 2014/0331668 A1* | 11/2014 | Bidner | ............. | F02M 26/36 60/605.2 |
| 2014/0331970 A1* | 11/2014 | Bidner | ............. | F02D 19/0642 123/435 |
| 2014/0360461 A1* | 12/2014 | Ulrey | ............. | F02M 26/43 123/299 |
| 2015/0219028 A1* | 8/2015 | Gingrich | ............. | F02D 41/008 123/445 |
| 2015/0322904 A1* | 11/2015 | Leone | ............. | F02D 41/0025 701/104 |
| 2015/0337696 A1* | 11/2015 | Glugla | ............. | F02D 41/003 123/574 |
| 2015/0361927 A1* | 12/2015 | Glugla | ............. | F02M 35/108 60/603 |
| 2015/0369178 A1* | 12/2015 | Asai | ............. | F02B 73/00 123/3 |
| 2015/0369180 A1* | 12/2015 | Leone | ............. | F02N 11/0803 123/52.1 |
| 2016/0040589 A1* | 2/2016 | Glugla | ............. | F02D 41/0065 60/278 |
| 2016/0040607 A1* | 2/2016 | Ku | ............. | F02M 26/07 123/568.17 |
| 2016/0047341 A1* | 2/2016 | Styles | ............. | F02D 41/008 123/568.18 |
| 2016/0076488 A1* | 3/2016 | Henry | ............. | F01N 3/101 60/274 |
| 2016/0102636 A1* | 4/2016 | Styles | ............. | F02D 41/008 123/568.21 |
| 2016/0153375 A1* | 6/2016 | Klingbeil | ............. | F02D 41/0027 123/577 |
| 2016/0230712 A1* | 8/2016 | Akinyemi | ............. | F02D 21/08 |
| 2016/0245239 A1* | 8/2016 | Henry | ............. | F02M 69/046 |
| 2016/0252027 A1* | 9/2016 | Jackson | ............. | F02D 19/081 60/605.2 |
| 2016/0333830 A1* | 11/2016 | Henry | ............. | F02M 26/43 |
| 2016/0341157 A1* | 11/2016 | Henry | ............. | F02M 26/43 |
| 2017/0074214 A1* | 3/2017 | Chiu | ............. | F02D 41/008 |
| 2017/0107880 A1* | 4/2017 | Bartley | ............. | F01N 3/2803 |
| 2017/0145966 A1* | 5/2017 | Yao | ............. | F02B 47/08 |
| 2017/0284315 A1* | 10/2017 | Asai | ............. | F02D 21/08 |
| 2017/0305411 A1* | 10/2017 | Leone | ............. | F02M 26/43 |
| 2017/0363057 A1* | 12/2017 | Gukelberger | ............. | F02M 26/35 |
| 2018/0094612 A1* | 4/2018 | Henry | ............. | B01J 23/44 |
| 2018/0223777 A1* | 8/2018 | Gukelberger | ............. | F02M 26/43 |
| 2019/0153965 A1* | 5/2019 | Asai | ............. | F02D 19/0671 |
| 2019/0226410 A1* | 7/2019 | Asai | ............. | F02D 41/1475 |
| 2019/0234354 A1* | 8/2019 | Asai | ............. | F02D 41/0065 |
| 2019/0249597 A1* | 8/2019 | Asai | ............. | F02D 41/0025 |
| 2019/0249626 A1* | 8/2019 | Asai | ............. | F02B 51/02 |
| 2019/0293003 A1* | 9/2019 | Asai | ............. | F02M 26/17 |
| 2019/0293012 A1* | 9/2019 | Asai | ............. | F02M 27/02 |
| 2019/0301382 A1* | 10/2019 | Asai | ............. | F02B 75/18 |

FOREIGN PATENT DOCUMENTS

| | | | | |
|---|---|---|---|---|
| FR | 2928698 A1 * | 9/2009 | ......... | F02D 19/0628 |
| FR | 2928699 A1 * | 9/2009 | ......... | F02D 19/0644 |
| FR | 2928700 A1 * | 9/2009 | ............. | F02M 26/46 |
| JP | 2003-293867 A | 10/2003 | | |
| JP | 2004092520 A * | 3/2004 | ......... | F02D 19/0628 |
| JP | 2006-037816 A | 2/2006 | | |
| JP | 2006037816 A * | 2/2006 | ......... | F02D 19/0628 |
| JP | 2007-263039 A | 10/2007 | | |
| JP | 2007-332891 A | 12/2007 | | |
| JP | 2009197730 A * | 9/2009 | ............. | F02M 25/12 |
| JP | 2009-287403 A | 12/2009 | | |
| JP | 2012225324 A * | 11/2012 | | |
| JP | 2013007336 A * | 1/2013 | ............. | F02M 25/12 |
| JP | 2013-092137 A | 5/2013 | | |
| JP | 2014-101772 A | 6/2014 | | |
| JP | 2014-136978 A | 7/2014 | | |
| JP | 2014-148946 A | 8/2014 | | |
| JP | 2015-040506 A | 3/2015 | | |

\* cited by examiner

INTERNAL COMBUSTION ENGINE

CROSS REFERENCES TO RELATED APPLICATIONS

This application is a national stage application pursuant to 35 U.S.C. § 371 of International Application No. PCT/JP2018/033376, filed on Sep. 10, 2018, which claims priority under 35 U.S.C. § 119 to Japanese Patent Application No. 2017-181203, filed on Sep. 21, 2017, the disclosures of which are hereby incorporated by reference in their entireties.

TECHNICAL FIELD

The present invention relates to an internal combustion engine including a fuel reformation unit that generates reformed fuel that is based on liquid fuel containing hydrocarbons and is higher in octane rating than the liquid fuel.

BACKGROUND ART

An internal combustion engine known to date includes a fuel reformation cylinder of a reciprocal mechanism for generating reformed fuel low in ignitability (high in octane rating) by reforming liquid fuel, and includes an output cylinder that yields an engine output by sucking and combusting an air-fuel mixture that contains the reformed fuel obtained through reformation (see e.g. Patent Literature 1, hereinafter referred to as PTL 1). In another known internal combustion engine, reformed fuel that has been obtained through reformation using a reformation catalyst and is low in ignitability is premixed with air and sucked into a cylinder, and then the resultant premixture is combusted (see e.g. Patent Literatures 2 and 3, hereinafter referred to as PTL 2 and PTL 3, respectively).

In the internal combustion engine described in PTL 1, liquid fuel such as light oil, gasoline, heavy oil, or the like, which contains hydrocarbons, is supplied to the fuel reformation cylinder, and the air-fuel mixture high in equivalence ratio is adiabatically compressed in the fuel reformation cylinder. Accordingly, reformed fuel based on the liquid fuel is generated under a high temperature and high pressure environment. The reformed fuel has a high anti-knock property, such as hydrogen ($H_2$), carbon monoxide (CO), methane ($CH_4$), and the like, that is, is a gaseous fuel high in octane rating. After that, the reformed fuel is premixed with air to form a lean premixture, and then the formed lean premixture is supplied to an output cylinder. The lean premixture is combusted in the output cylinder to which the lean premixture has been supplied (uniform lean premixture combustion) to yield an engine output.

To achieve favorable uniform lean premixture combustion in the above-described output cylinder, after a lean premixture containing reformed fuel is sucked into the output cylinder, fuel (e.g. light oil) higher in ignitability than the reformed fuel is injected as pilot fuel at an ignition timing near the compression top dead center (a dual fuel engine). Thus, favorable ignition of a lean premixture using reformed fuel low in ignitability can be attained and combustion at an optimum timing can be achieved.

With the above-described dual fuel engine, uniform lean premixture combustion is performed in the output cylinder and it is thus enabled to reduce the amount of emission of NOx and reduce the amount of emission of soot. In addition, since reformed fuel having a high anti-knock property is combusted as fuel, knocking can be suppressed, and combustion at an optimum timing can be achieved by injecting fuel for ignition. As a result, the efficiency of combustion can be enhanced.

CITATION LIST

Patent Literature

PTL 1: Japanese Patent Application Laid-Open No. 2014-136978
PTL 2: Japanese Patent Application Laid-Open No. 2015-040506
PTL 3: Japanese Patent Application Laid-Open No. 2003-293867

SUMMARY OF INVENTION

Technical Problem

As described above, when a lean premixture containing reformed fuel is supplied to an output cylinder to cause ignition, problems are found, which are described below.

In the internal combustion engine described in PTL 1 listed above, an over-enriched premixture high in equivalence ratio is formed by supplying only oxygen necessary for a reformation reaction (such as a partial oxidation reaction) to a fuel reformation cylinder. Under a high temperature and high pressure environment in the fuel reformation cylinder, adiabatical compression is performed. Then, higher hydrocarbons are thermally decomposed into lower hydrocarbons having a high anti-knock property and reformed fuel is obtained. If an air-fuel mixture high in equivalence ratio is formed and reformed in the fuel reformation cylinder, not all of the fuel added may be thermally decomposed and part of the fuel may be discharged from the fuel reformation cylinder as higher hydrocarbon fuel together with the reformed fuel without being changed. If the higher hydrocarbon fuel is discharged together with the reformed fuel and introduced to the output cylinder and if the internal combustion engine is in a high intensity operational state, high ignitability of the higher hydrocarbons may cause unintended abnormal combustion, such as premature ignition (preignition), which can damage the internal combustion engine.

In each of the combustion methods using the reformation catalysts according to PTL 2 and PTL 3 listed above, the temperature of the reformation catalyst needs to be raised to a temperature at which a catalyst reaction starts (e.g. 600 K or higher, which depends on the catalyst) to reform higher hydrocarbon fuel, such as gasoline or light oil. It is, however, not easy to maintain the temperature of the reformation catalyst at a stable catalyst reaction temperature from the start of the operation of the internal combustion engine. In addition, to enhance the reformation efficiency of the reformation catalyst, the concentration of oxygen in the gas to be introduced to the reformation catalyst needs to be controlled to a minimum necessary. It is, however, not easy to control the concentration of the oxygen in the gas to be introduced to the reformation catalyst while maintaining the flow rate of the gas flowing through the reformation catalyst to some extent. If the gas to be introduced to the reformation catalyst is taken from outside air or the exhaust gas discharged from the output cylinder where lean burn combustion is being performed, decrease in reformation efficiency can be unavoidable.

The present invention has been made in view of such circumstances and its principal technical object is to provide an internal combustion engine that enables normal combustion of a lean premixture generated from reformed fuel to be achieved in a wide operational range.

Solution to Problem

To attain the above-described principal technical object, an aspect of the present invention provides an internal combustion engine including a fuel reformation unit that generates reformed fuel based on liquid fuel and higher in octane rating than the liquid fuel and introduces the generated reformed fuel to an output cylinder, the fuel reformation unit including a first fuel reformer that includes a reciprocal mechanism where a piston reciprocates in a cylinder, a second fuel reformer that includes a reformation catalyst, and a reformed gas passage that connects the first fuel reformer and the second fuel reformer. In the internal combustion engine, first reformed gas discharged from the first fuel reformer is introduced to the second fuel reformer through the reformed gas passage.

It is preferable that the fuel reformation unit further include a supplemental air introduction passage through which at least one of outside air and exhaust discharged from the output cylinder is introduced to the reformed gas passage as supplemental air.

The fuel reformation unit may further include an introduction gas temperature detector that detects a temperature of introduction gas introduced to the second fuel reformer, an introduction gas temperature adjustment mechanism that adjusts the temperature of the introduction gas introduced to the second fuel reformer, and a controller that controls the introduction gas temperature adjustment mechanism according to the temperature of the introduction gas detected by the introduction gas temperature detector.

The introduction gas temperature adjustment mechanism may include a first reformed gas temperature adjustment mechanism that adjusts a temperature of the first reformed gas, and the controller may perform adjustment so that the introduction gas has a predetermined temperature by controlling the first reformed gas temperature adjustment mechanism according to the detected temperature of the introduction gas.

The introduction gas temperature adjustment mechanism may include a first heat exchanger arranged on the reformed gas passage, an exhaust gas communication passage that allows exhaust gas discharged from the output cylinder to flow to the first heat exchanger, and an exhaust gas flow rate adjustment valve that adjusts a flow rate of the exhaust gas flowing through the exhaust gas communication passage, and the controller may adjust the temperature of the introduction gas by controlling the exhaust gas flow rate adjustment valve.

The fuel reformation unit may further include an equivalence ratio adjustment mechanism that supplies fuel to the reformed gas passage and adjusts an equivalence ratio of the introduction gas to be introduced to the second fuel reformer.

The fuel reformation unit may further include a water supply mechanism that supplies water to the reformed gas passage.

The fuel reformation unit may further include a second heat exchanger through which introduction gas to be introduced to the first fuel reformer and second reformed gas discharged from the second fuel reformer flow.

ADVANTAGEOUS EFFECTS OF INVENTION

The present invention provides an internal combustion engine including a fuel reformation unit that generates reformed fuel based on liquid fuel and higher in octane rating than the liquid fuel and introduces the generated reformed fuel to an output cylinder, the fuel reformation unit including a first fuel reformer that includes a reciprocal mechanism where a piston reciprocates in a cylinder, a second fuel reformer that includes a reformation catalyst, and a reformed gas passage that connects the first fuel reformer and the second fuel reformer. In the internal combustion engine, a first reformed gas discharged from the first fuel reformer is introduced to the second fuel reformer through the reformed gas passage. Thus, an internal combustion engine can be provided that enables normal combustion of a lean premixture generated from reformed fuel to be achieved in a wide operational range.

DESCRIPTION OF EMBODIMENTS

An internal combustion engine according to an embodiment of the present invention is described in detail below with reference to the drawings.

Figure 1:
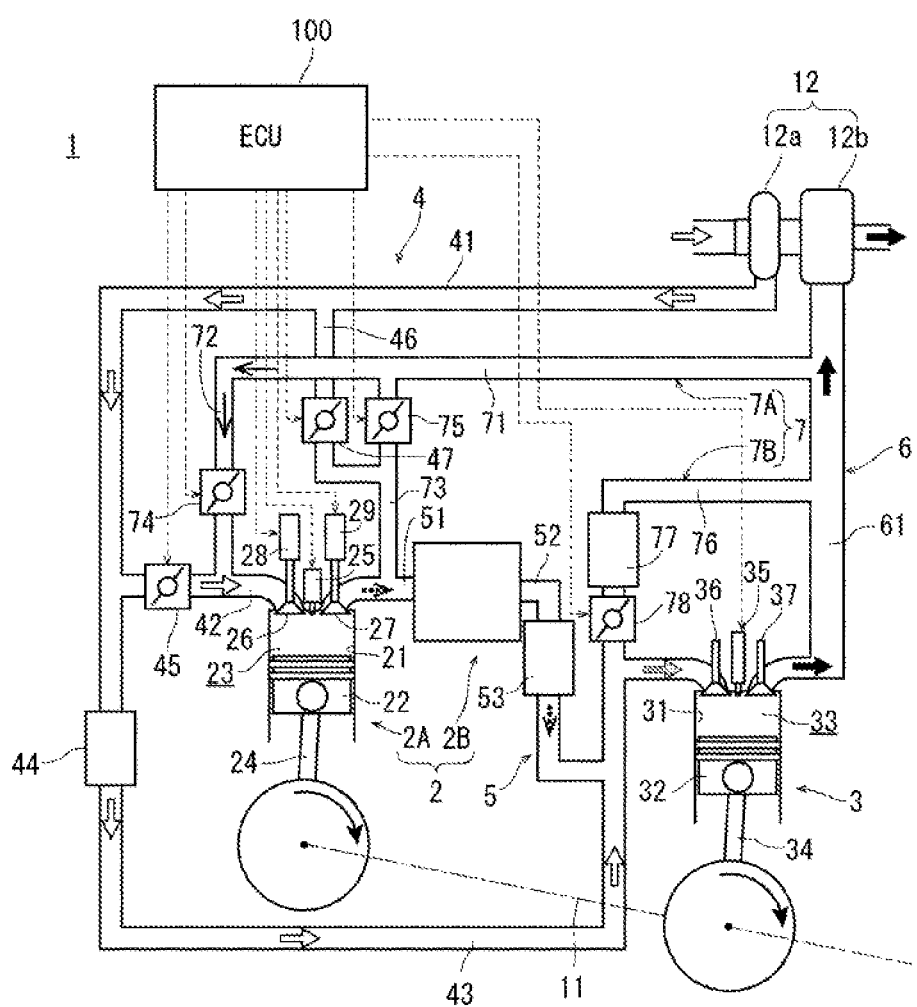
FIG. 1 A diagram schematically illustrating a system structure of an internal combustion engine according to an embodiment of the present invention.

FIG. 1 schematically illustrates a structure of an internal combustion engine 1 and a control system including an ECU 100 as a controller of the internal combustion engine 1 according to the present embodiment. The internal combustion engine 1 is applied to, for example, a stationary generator and includes a fuel reformation unit 2 and an output cylinder 3. A piping system of the internal combustion engine 1 is made up of an intake system 4 for the fuel reformation unit 2 and the output cylinder 3 mentioned above, a reformed fuel supply system 5, an exhaust system 6, and an EGR system 7.

The fuel reformation unit 2 includes a fuel reformation cylinder 2A, a fuel reformation catalyst 2B, and a first reformed gas passage 51 through which first reformed gas discharged from the fuel reformation cylinder 2A is introduced to the fuel reformation catalyst 2B. The fuel reformation cylinder 2A constitutes a first fuel reformer. The fuel reformation catalyst 2B is included in a second fuel reformer.

The fuel reformation cylinder 2A includes a reciprocal mechanism where a piston 22 reciprocates in a cylinder 21 provided in an unillustrated cylinder block. In the fuel reformation cylinder 2A, a fuel reformation chamber 23 is formed by a cylinder bore 21, the piston 22, and an unillustrated cylinder head.

An injector 25 from which fuel containing many higher hydrocarbons, such as light oil, is supplied to the fuel reformation chamber 23 is arranged on the fuel reformation cylinder 2A. In the fuel reformation chamber 23, the fuel is supplied from the injector 25 and adiabatically compressed using the piston 22 under a high temperature and high pressure environment. As a result, the fuel is reformed and the reformed fuel (first reformed gas) is generated that contains hydrogen, carbon monoxide, methane, and the like and has a high anti-knock property. The fuel supplied to the fuel reformation chamber 23 may be another liquid fuel containing hydrocarbons, such as gasoline, heavy oil, or the like. The injector 25 is not limited to the injector configured to supply the fuel directly to the fuel reformation chamber 23 as described above. For example, the injector 25 may be arranged on a fuel reformation cylinder intake passage 42 that introduces air to the fuel reformation cylinder 2A to supply the fuel.

As the fuel reformation catalyst 2B, a known fuel reformation catalyst may be employed. For example, a catalyst using a material, such as $Pt/CeO_2$ or the like, may be employed. If such a catalyst is employed, the concentration of an ingredient in each gas can be adjusted by varying, for example, the temperature or equivalence ratio of the gas sucked. The first reformed gas obtained through reformation in the fuel reformation cylinder 2A and then discharged is introduced to the fuel reformation catalyst 2B. The fuel reformation catalyst 2B is used to reform the first reformed gas containing remaining higher hydrocarbons that have failed to be reformed through the fuel reformation cylinder 2A. This action will be described in detail later.

Similar to the fuel reformation cylinder 2A, the output cylinder 3 is structured as a reciprocal type. Specifically, the output cylinder 3 is structured with a piston 32 accommodated in a cylinder bore 31 formed in the unillustrated cylinder block so that the piston 32 can reciprocate. In the output cylinder 3, a combustion chamber 33 is formed by the cylinder bore 31, the piston 32, and an unillustrated cylinder head.

In the internal combustion engine 1 according to the present embodiment, for example, four cylinders are provided in the cylinder block and one of the cylinders is structured as the fuel reformation cylinder 2A while the other three cylinders are structured as the output cylinders 3 (only one of which is illustrated in the diagrams). The first reformed gas generated in the fuel reformation cylinder 2A is introduced to the fuel reformation catalyst 2B through the first reformed gas passage 51 and in the fuel reformation catalyst 2B, a reformation reaction is further caused and second reformed gas is generated. After that, the second reformed gas is supplied to each output cylinder 3 together with air. The numbers of the fuel reformation cylinders 2A and the output cylinders 3 are not limited to the aforementioned numbers. If, for example, the cylinder block includes six cylinders, two of the cylinders may be structured as the fuel reformation cylinders 2 and the other four cylinders may be structured as the output cylinders 3. It is preferable that the number of the fuel reformation cylinders 2A be smaller than the number of the output cylinders 3.

The piston 22 of the fuel reformation cylinder 2A and the piston 32 of the output cylinder 3 are coupled to a crankshaft 11, which is illustrated using an alternate long and short dash line in the diagram, with interposition of connecting rods 24 and 34, respectively. The crankshaft 11 is coupled to an unillustrated generator with interposition of an unillustrated clutch mechanism and the like.

As described above, the output cylinder 3 includes the combustion chamber 33 and an injector 35 from which fuel for ignition (such as light oil) is supplied is arranged on the combustion chamber 33. In the combustion chamber 33, the first reformed gas generated in the fuel reformation cylinder 2 is supplied together with air and EGR gas, which will be described later, and a uniform lean premixture is formed and compressed using the piston 32. After that, a trace of the fuel for ignition is injected from the injector 35 near the compression top dead center and flame propagation combustion is performed with the fuel for ignition serving as an ignition source. Thus, the reciprocation of the piston 32 is changed into rotary motion of the crankshaft 11 and an engine output is yielded.

The intake system 4 introduces air (outside air) to each of the fuel reformation unit 2 and the output cylinder 3. The intake system 4 includes a main intake passage 41, the fuel reformation cylinder intake passage 42, an output cylinder intake passage 43, and a fuel reformation catalyst intake passage 46. The fuel reformation cylinder intake passage 42 branches from the main intake passage 41 and introduces air to the fuel reformation cylinder 2A. The output cylinder intake passage 43 introduces air from the main intake passage 41 to the output cylinder 3. The fuel reformation catalyst intake passage 46 introduces outside air to the fuel reformation catalyst 2B. The main intake passage 41 includes a compressor wheel 12a of a turbocharger 12. The fuel reformation cylinder intake passage 42 is connected to the intake port of the fuel reformation cylinder 2A. An intake valve 26 is arranged between this intake port and the fuel reformation chamber 23 of the fuel reformation cylinder 2 so that the intake valve 26 can open and close. Further, the fuel reformation cylinder intake passage 42 includes an intake amount adjustment valve 45 whose opening degree is adjustable. The output cylinder intake passage 43 is connected to the intake port of the output cylinder 3. An intake valve 36 is arranged between this intake port and the combustion chamber 33 of the output cylinder 3 so that the intake valve 36 can open and close. Further, the output cylinder intake passage 43 includes an intake cooler (intercooler) 44.

The reformed fuel supply system 5 includes the fuel reformation cylinder 2A and the fuel reformation catalyst 2B provided in the fuel reformation unit 2 and supplies the reformed fuel generated in the fuel reformation unit 2 to the combustion chamber 33 of the output cylinder 3.

The reformed fuel supply system 5 further includes the first reformed gas passage 51 and a second reformed gas passage 52. Through the first reformed gas passage 51, gas containing the first reformed gas discharged from the fuel reformation cylinder 2A is introduced to the fuel reformation catalyst 2B. The upstream end of the first reformed gas passage 51 is connected to the exhaust port of the fuel reformation cylinder 2A and the downstream end of the first reformed gas passage 51 is connected to the inlet of the fuel reformation catalyst 2B. Through the second reformed gas passage 52, gas containing the second reformed gas discharged from an outlet of the fuel reformation catalyst 2B is introduced to the output cylinder intake passage 43. A reformed fuel cooler 53 is provided downstream of the fuel reformation catalyst 2B in the second reformed gas passage 52. An unillustrated mixer is provided in a connection portion between the second reformed gas passage 52 and the output cylinder intake passage 43. Thus, the reformed gas generated in the fuel reformation unit 2 is mixed in this mixer with the air flowing through the output cylinder intake passage 43 and supplied to the combustion chamber 33 of the output cylinder 3.

The exhaust system 6 includes an exhaust passage 61 from which exhaust gas resulting from combustion of fuel in the output cylinder 3 is discharged outside the internal combustion engine 1. A turbine 12b of the turbocharger 12 is provided on the exhaust passage 61. The exhaust passage 61 is connected to the exhaust port of the output cylinder 3. The exhaust valve 37 is provided between the exhaust port and the combustion chamber 33 of the output cylinder 3.

The EGR system 7 is a piping path through which the exhaust gas discharged from the output cylinder 3 is introduced to the fuel reformation unit 2 and the output cylinder 3 and includes a fuel reformation unit EGR system 7A and an output cylinder EGR system 7B.

The fuel reformation unit EGR system 7A includes a fuel reformation unit EGR passage 71 through which exhaust gas is supplied to the fuel reformation unit 2. The upstream end of the fuel reformation unit EGR passage 71 is connected to the exhaust passage 61. The fuel reformation unit EGR passage 71 branches into a fuel reformation cylinder EGR passage 72 through which exhaust gas is introduced toward the fuel reformation cylinder 2A, and a fuel reformation catalyst EGR passage 73 through which exhaust gas is introduced toward the fuel reformation catalyst 2B.

A fuel reformation cylinder EGR gas amount adjustment valve 74 is provided on the fuel reformation cylinder EGR passage 72. A fuel reformation catalyst EGR gas amount adjustment valve 75 is provided in the fuel reformation catalyst EGR passage 73. An EGR gas cooler may be arranged in any position in the fuel reformation unit EGR system 7A as needed, the illustration of which is omitted.

The output cylinder EGR system 7B includes an output cylinder EGR passage 76 through which part of the exhaust gas flowing through the exhaust passage 61 returns to the combustion chamber 33 of the output cylinder 3. The upstream end of the output cylinder EGR passage 76 is connected to the exhaust passage 61. The downstream end of the output cylinder EGR passage 76 is connected to the downstream side of the mixer arranged on the output cylinder intake passage 43. An EGR gas cooler 77 is arranged on the output cylinder EGR passage 76. An output cylinder EGR gas amount adjustment valve 78 is arranged on the downstream side of the EGR gas cooler 77 of the output cylinder EGR passage 76 (i.e. on the side of the output cylinder 3).

As described above, the intake system 4 includes the fuel reformation catalyst intake passage 46 that connects the main intake passage 41 and the fuel reformation catalyst EGR passage 73 and introduces outside air to the fuel reformation catalyst EGR passage 73. Specifically, the upstream end of the fuel reformation catalyst intake passage 46 is connected to the downstream side of the compressor wheel 12a on the main intake passage 41 and further on the upstream side than a branch portion where branching to the fuel reformation cylinder intake passage 42 occurs. The downstream end of the fuel reformation catalyst intake passage 46 is connected to the downstream side of the fuel reformation catalyst EGR gas amount adjustment valve 75 on the fuel reformation catalyst EGR passage 73. On the fuel reformation catalyst intake passage 46, an outside air introduction amount adjustment valve 47 for adjusting the amount of the outside air to be introduced to the fuel reformation catalyst EGR passage 73 through the fuel reformation catalyst intake passage 46 is arranged.

The intake cooler 44, the reformed fuel cooler 53, and the EGR gas cooler 77 of the present embodiment, described above, are cooled by cooling water of the internal combustion engine 1. The intake cooler 44, the reformed fuel cooler 53, the EGR gas cooler 77 are not limited to those that are cooled by the cooling water of the internal combustion engine 1 but may be cooled using an air cooling system or another cold source.

The control system of the internal combustion engine 1 is further described with reference to FIG. 1. A schematic structure of the control system of the internal combustion engine 1 is illustrated using dotted lines in the diagram. The internal combustion engine 1 includes an electronic control unit (ECU) 100. The ECU 100 serves as a controller that controls various actuators provided in the internal combustion engine 1. The ECU 100 is configured with a computer and includes a central processing unit (CPU), read only memory (ROM), random access memory (RAM), an input interface, an output interface, and the like, specific illustration of which is omitted. The CPU performs arithmetic operations in accordance with a control program. The ROM stores the control program, various control maps, and the like. The RAM is readable and writable and is used to temporarily store detection values detected, arithmetic results, and the like.

The injectors 25 and 35, the adjustment valves 45, 47, 74, 75, and 78, and the like are electrically connected to the ECU 100. The intake valve 26 and an exhaust valve 27 of the fuel reformation cylinder 2A include variable valve units 28 and 29, respectively, and are configured so that opening and closing timings of the intake valve 26 and the exhaust valve 27 can be changed as desired. The ECU 100 is electrically connected to the variable valve units 28 and 29.

The internal combustion engine 1 includes an intake air flow rate sensor, a sucked gas pressure sensor, a sucked gas temperature sensor, a sucked gas $O_2$ sensor, an exhaust pressure sensor, a sensor of the water temperature of the internal combustion engine 1, a sensor of the rotation speed of the internal combustion engine 1, an accelerator lever opening degree sensor, and the like, which are not illustrated. Each sensor functions as an operational state detection unit that detects an operational state of the internal combustion engine 1. Each sensor is connected to the ECU 100 and transmits output signals to the ECU 100 at predetermined time intervals.

According to the output signals of each of the aforementioned sensors, the ECU 100 performs, for example, fuel injection control to adjust starting timings and ending timings of the injection of each of the injectors 25 and 35, opening and closing control of each of the adjustment valves 45, 47, 74, 75, and 78, and the like, and opening and closing timing control of the intake valve 26 and the exhaust valve 27 using the variable valve units 28 and 29.

The operation of the internal combustion engine 1 of the present embodiment is described below with reference to FIG. 1.

Air to be introduced to the main intake passage 41 undergoes pressurization using the compressor wheel 12a of the turbocharger 12. This air is then divided to the fuel reformation cylinder intake passage 42, the output cylinder intake passage 43, the fuel reformation catalyst intake passage 46, and the like. At this time, the flow rate of the sucked air that flows through the fuel reformation cylinder intake passage 42 is adjusted by the intake amount adjustment valve 45 and the flow rate of the outside air that flows into the fuel reformation catalyst intake passage 46 is adjusted by the outside air introduction amount adjustment valve 47.

Further, the EGR gas that has flowed through the fuel reformation unit EGR system 7A is introduced to the fuel reformation cylinder intake passage 42. At this time, the amount of the EGR gas introduced to the fuel reformation cylinder intake passage 42 is adjusted by the EGR gas amount adjustment valve 74. As a result, the air and the EGR gas are introduced to the fuel reformation chamber 23 of the fuel reformation cylinder 2A. At this time, the flow rate of the sucked air adjusted according to the opening degree of the intake amount adjustment valve 45 and the flow rate of the EGR gas adjusted according to the opening degree of the EGR gas amount adjustment valve 74 are adjusted while the equivalence ratio in the fuel reformation chamber 23 is adjusted so that the fuel can be reformed favorably in the fuel reformation chamber 23. Specifically, the opening degrees of the intake amount adjustment valve 45 and the EGR gas amount adjustment valve 74 are controlled so that the equivalence ratio in the fuel reformation chamber 23 in a case where the fuel is supplied from the injector 25 to the fuel reformation chamber 23 has a predetermined value, which is 2.5 or higher (preferably, 4.0 or higher) for example. The control can be performed according to, for example, an opening degree setting map made in advance through experiments, simulations, and the like. If the EGR gas cooler is provided on the fuel reformation unit EGR passage 71 so that temperature control is possible, the EGR gas flow rate of the EGR gas cooler may be controlled so that the gas temperature of the fuel reformation chamber 23 has a value higher than or equal to the lower limit of the temperature that enables reformation reaction.

As described above, fuel is supplied from the injector 25 to the fuel reformation chamber 23 while the air and the EGR gas are introduced to the fuel reformation chamber 23 of the fuel reformation cylinder 2A. The amount of the fuel supplied from the injector 25 is set according to a required engine output, which is obtained through a computation based on the operational state of the internal combustion engine 1. Specifically, the valve opening period of the injector 25 is set so as to achieve a target fuel supply amount according to the pressure of the fuel supplied to the injector 25. The opening period of the injector 25 in this case is set so that injection of the target fuel supply amount is completed by the time at which an intake stroke of the fuel reformation cylinder 2A is finished. The opening period of the injector 25 is not limited to this but may be another period as long as the period enables formation of a homogeneous air-fuel mixture in the fuel reformation chamber 23 before the piston 22 reaches the compression top dead center. If the injector 25 is arranged on the fuel reformation cylinder intake passage 42, the opening period of the injector 25 is set so that the fuel injected from the injector 25 is introduced into the fuel reformation chamber 23 within the opening period of the intake valve 26 of the fuel reformation cylinder 2A.

As the piston 22 moves toward the compression top dead center, the pressure and temperature of the fuel reformation chamber 23 rise, and in the fuel reformation chamber 23, the above-described air-fuel mixture is adiabatically compressed. As a result, for example, a dehydrogenation reaction of the fuel, a partial oxidation reaction, a steam reforming reaction, and a thermal dissociation reaction take place under a high temperature and high pressure environment such that the fuel is reformed into reformed fuel with a high anti-knock property, which contains hydrogen ($H_2$), carbon monoxide (CO), methane ($CH_4$), and the like. In the present embodiment, the reformed fuel obtained through the reformation of liquid fuel is in gaseous form and thus, the reformed fuel may also be referred to as the "reformed gas" hereinafter.

The first reformed gas generated in the fuel reformation chamber 23 is discharged through the exhaust valve 27 of the fuel reformation cylinder 2A and introduced to the fuel reformation catalyst 2B through the first reformed gas passage 51. The fuel reformation catalyst 2B reforms the higher hydrocarbons that have failed to be reformed in the fuel reformation cylinder 2A into lower hydrocarbons or reforms a product in the first reformed gas reformed in the fuel reformation cylinder 2A so that the product is adjusted to be a gas ingredient desired in the output cylinder 3 and generates second reformed gas.

The second reformed gas discharged from the fuel reformation catalyst 2B flows through the second reformed gas passage 52 to be cooled by the reformed fuel cooler 53. This cooling increases the density of the reformed gas and suppresses preignition of the second reformed gas in the output cylinder intake passage 43 or the combustion chamber 33. This cooled second reformed gas is mixed with the air flowing through the output cylinder intake passage 43 and introduced into the combustion chamber 33 of the output cylinder 3 together with the EGR gas introduced through the output cylinder EGR passage 76.

As described above, the air, the second reformed gas, and the EGR gas are introduced into the combustion chamber 33 of the output cylinder 3 and the equivalence ratio in the combustion chamber 33 is adjusted to a desired value.

In the output cylinder 3, a lean premixture is adiabatically compressed in a compression stroke, and at a timing at which the piston 32 reaches the compression top dead center, a trace of fuel high in ignitability is injected from the injector 35. Thus, the premixture that has been compressed in the combustion chamber 33 is ignited, and lean premixture combustion is performed. If the premixture in the combustion chamber 33 can be ignited at a desired timing without injection of the trace of fuel from the injector 35, the injection of the fuel from the injector 35 is not necessarily required.

Through the above-described combustion, the piston 32 reciprocates and the crankshaft 11 rotates. As a result, an engine output can be obtained. This engine output is transmitted to the generator for example, and is partially used as a driving source for the reciprocation of the piston 22 in the fuel reformation cylinder 2A.

With the internal combustion engine 1, uniform lean premixture combustion is performed in the output cylinder 3 and it is thus enabled to reduce the amount of emission of NOx and the amount of emission of soot. Accordingly, it is enabled to obviate the need for a post-processing unit (such as a particulate filter, a NOx catalyst, or the like) for purifying exhaust gas or enabled to largely reduce its capacity. Then, combustion of a fuel having a high anti-knock property is performed. As a result, it is enabled to suppress knocking and enhance the efficiency of combustion since combustion at an optimum timing can be achieved through diesel pilot ignition to inject light oil or the like as described above.

The fuel reformation unit 2 is configured so that the first reformed gas discharged from the fuel reformation cylinder 2A is introduced to the fuel reformation catalyst 2B through the first reformed gas passage 51. Thus, even if an air-fuel mixture high in equivalence ratio is formed and fuel is reformed in the fuel reformation cylinder 2A and not all of the fuel added is thermally decomposed and part of the fuel is discharged from the fuel reformation cylinder 2A as a higher hydrocarbon fuel together with the first reformed gas, the reformation is further performed through the fuel reformation catalyst 2B at a later stage. That is, the fuel reformation catalyst 2B makes it possible to reform the higher hydrocarbons that have failed to be reformed in the fuel reformation cylinder 2A at a previous stage. As described above, typically, the fuel reformation catalyst 2B needs to be raised to a predetermined temperature so as to cause a reformation reaction. In this regard, the internal combustion engine 1 related to the present embodiment has a structure in which the fuel reformation cylinder 2A and the fuel reformation catalyst 2B communicate through the first reformed gas passage 51 to cooperate. Thus, the first reformed gas in a high temperature state that has been discharged from the fuel reformation cylinder 2A is supplied to the fuel reformation catalyst 2B and the temperature of the fuel reformation catalyst 2B is raised rapidly. As a result, a reformation reaction in the fuel reformation catalyst 2B can be caused rapidly after the internal combustion engine 1 has started to operate.

The internal combustion engine 1 in the present embodiment further has a structure in which supplemental air is introduced to the first reformed gas passage 51. In the fuel reformation cylinder 2A, an air-fuel mixture having a high equivalence ratio, that is, a fuel over-enriched premixture is made to react to generate the first reformed gas. If the first reformed gas is generated through such reaction, little oxygen remains in the first reformed gas as a result. If this first reformed gas is added to the fuel reformation catalyst 2B as it is, the reaction in the fuel reformation catalyst 2B is an endothermic reaction in many cases and thus, the temperature of the reaction field can be lowered. If the temperature of the reaction field falls, the reformation reaction in the fuel reformation catalyst 2B becomes limited. In the present embodiment, to promote a partial oxidation reaction, which is an exothermic reaction, supplemental air is introduced to the first reformed gas flowing through the first reformed gas passage 51 while raising the temperature of the reaction field. An example of the partial oxidation reaction caused by introducing supplemental air is presented in Expression 1 below.

[Mathematical Expression 1]

$$CH_4 + \tfrac{1}{2}O_2 \rightarrow CO + 2H_2 \quad (1)$$

As understood from Expression 1 above, carbon monoxide (CO) and hydrogen ($H_2$) can be generated from methane ($CH_4$) contained in the first reformed gas by introducing supplemental air to the first reformed gas and adding oxygen. This promotion of the reaction enables adjustment of the concentration ratio among the gas ingredients in the reformed gas added to the combustion chamber 33 of the output cylinder 3.

Examples of a means to achieve the introduction of supplemental air include utilization of the fuel reformation catalyst intake passage 46 illustrated in FIG. 1. By utilizing the above-described fuel reformation catalyst intake passage 46, the outside air (supplemental air) pressurized using the compressor wheel 12a of the turbocharger 12 can be efficiently introduced to the first reformed gas passage 51. A specific amount of the outside air introduced is adjusted by controlling the opening degree of the outside air introduction amount adjustment valve 47. The opening degree of the outside air introduction amount adjustment valve 47 is controlled according to a map made through experiments, simulations, and the like, in which opening degrees suitable for operational states are set.

As another means to achieve the introduction of supplemental air, the above-described fuel reformation catalyst EGR passage 73 can also be utilized. In particular, in cases where uniform lean premixture combustion (lean burn combustion) is performed in the output cylinder 3 while the air-fuel mixture contains an excessive amount of oxygen, the exhaust gas discharged from the output cylinder 3 contains a large amount of oxygen. Part of the exhaust gas can be introduced as the EGR gas to the first reformed gas passage 51 through the exhaust passage 61, the fuel reformation unit EGR passage 71, and the fuel reformation catalyst EGR passage 73 to serve as the supplemental air. The amount of the EGR gas introduced is adjusted by controlling the opening degree of the fuel reformation catalyst EGR gas amount adjustment valve 75. The opening degree of the outside air introduction amount adjustment valve 47 is controlled according to the map made through experiments, simulations, and the like, in which opening degrees suitable for operational states are set.

The present invention is not limited to adoption of only one of the above-described means, i.e. the means that utilizes the fuel reformation catalyst intake passage 46 and the means that utilizes the fuel reformation catalyst EGR passage 73. The introduction of supplemental air may be achieved by combining both of the means. In that case, in the means utilizing the fuel reformation catalyst intake passage 46, outside air is introduced and the supplemental air is relatively low in temperature accordingly while, in the means that utilizes the fuel reformation catalyst EGR passage 73, exhaust gas after combustion in the output cylinder 3 is used and the supplemental air is relatively high in temperature accordingly. Thus, the temperature state of the fuel reformation catalyst 2B can be favorably controlled by correcting the supply proportion from both of the passages 46 and 73 according to the temperature state of the fuel reformation catalyst 2B.

The present invention is not limited to the above-described embodiment and different variations can be envisioned as long as the variations are included within the technical scope of the present invention. Each variation is described below.

Figure 2:
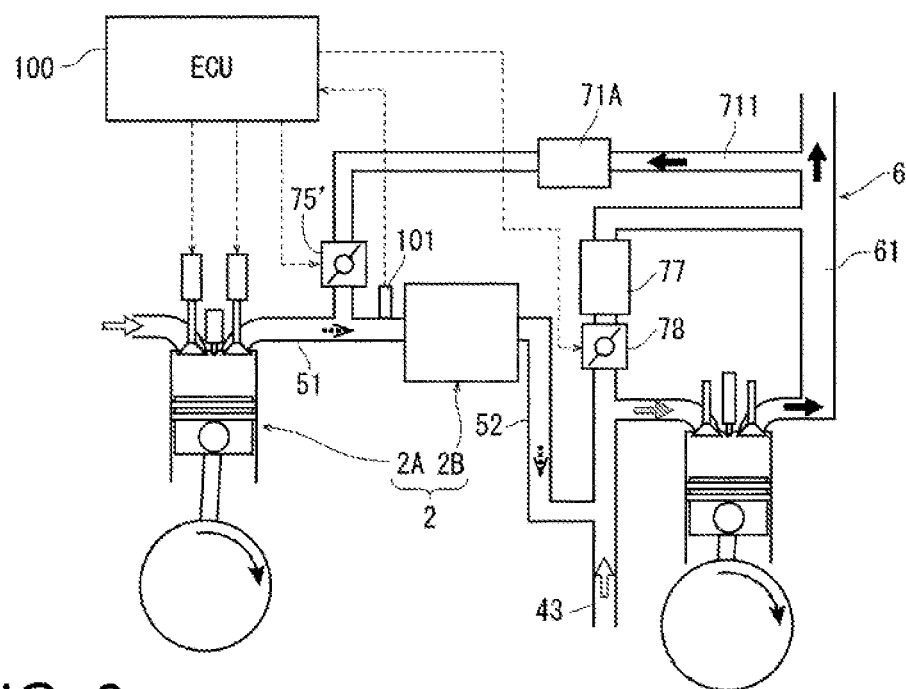
FIG. 2 A partial extraction diagram of the internal combustion engine for describing a variation of an introduction gas temperature adjustment mechanism according to the embodiment illustrated in FIG. 1.

To favorably maintain a reformation reaction in the fuel reformation catalyst 2B of above-described embodiment, it is preferable that the temperature of the catalyst supported by the fuel reformation catalyst 2B be maintained within a predetermined temperature range. Thus, as illustrated in FIG. 2, an introduction gas temperature detector 101 that detects the temperature of introduction gas introduced to the fuel reformation catalyst 2B and an introduction gas temperature adjustment mechanism that adjusts the temperature of the introduction gas. The ECU 100 controls the introduction gas temperature adjustment mechanism according to the temperature of the introduction gas detected by the introduction gas temperature detector 101.

As illustrated in FIG. 2, the above-described introduction gas temperature adjustment mechanism includes, for example, a fuel reformation unit EGR passage 711, an EGR gas cooler 71A, and a fuel reformation catalyst EGR gas amount adjustment valve 75'. The upstream end of the fuel reformation unit EGR passage 711 is connected to the exhaust passage 61. The downstream end of the fuel reformation unit EGR passage 711 is connected to the first reformed gas passage 51. The EGR gas cooler 71A and the fuel reformation catalyst EGR gas amount adjustment valve 75' are arranged on the fuel reformation unit EGR passage 711.

Since the exhaust gas discharged from the output cylinder 3 has a high temperature, which is approximately 400 K to 800 K, depending on the operational state, the inlet temperature of the fuel reformation catalyst 2B can be raised by introducing the exhaust gas into the first reformed gas passage 51 through the fuel reformation unit EGR passage 711. The ECU 100 performs feedback control on the opening degree of the fuel reformation catalyst EGR gas amount adjustment valve 75' according to the temperature detected by the introduction gas temperature detector 101 so that the temperature of the introduction gas introduced to the fuel reformation catalyst 2B is a predetermined target temperature set according to the operational state. The above-described EGR gas cooler 71A is not essential. A higher temperature of the EGR gas introduced to the first reformed gas passage 51 is not necessarily better and there is a preferable temperature range. Thus, to adjust the EGR gas temperature within the suitable temperature range, it is preferable that the EGR gas cooler 71A be arranged on the fuel reformation unit EGR passage 711. The fuel reformation unit EGR passage 711 and the fuel reformation catalyst EGR gas amount adjustment valve 75' need not necessarily be set newly. The fuel reformation unit EGR passage 71 and the fuel reformation catalyst EGR gas amount adjustment valve 75 illustrated in FIG. 1 may be utilized as a fuel reformation unit EGR passage and a fuel reformation catalyst EGR gas amount adjustment valve, respectively.

The introduction gas temperature adjustment mechanism may include a first reformed gas temperature adjustment mechanism that adjusts the temperature of the first reformed gas discharged from the fuel reformation cylinder 2A. Specific variations of the first reformed gas temperature adjustment mechanism are described below.

The first reformed gas temperature adjustment mechanism according to a first variation includes the fuel reformation cylinder EGR passage 72 illustrated in FIG. 1. The fuel reformation cylinder EGR passage 72 enables it to raise the temperature (inlet temperature) of the gas introduced to the inlet of the fuel reformation cylinder 2A. Specifically, to raise the inlet temperature of the fuel reformation cylinder 2A, the fuel reformation cylinder EGR passage 72 and the fuel reformation cylinder EGR gas amount adjustment valve 74 are used. Since the exhaust gas discharged from the output cylinder 3 has a high temperature, which is approximately 400 K to 800 K, depending on the operational state, as described above. The inlet temperature of the fuel reformation cylinder 2A is raised by introducing the EGR gas to the gas introduced into the fuel reformation cylinder 2A through the fuel reformation cylinder EGR passage 72. As a result, the temperature of the first reformed gas discharged from the fuel reformation cylinder 2A can be raised. The degree of the rise in temperature of the first reformed gas can be adjusted by controlling the EGR gas amount adjustment valve 74. That is, when the amount of the EGR gas is adjusted by controlling the EGR gas amount adjustment valve 74, the inlet temperature of the fuel reformation cylinder 2A is adjusted and, as a result, the temperature of the first reformed gas is adjusted.

The first reformed gas temperature adjustment mechanism according to a second variation includes a variable valve unit 28. With the variable valve unit 28, the effective compression ratio of the fuel reformation cylinder 2A can be adjusted. The effective compression ratio of the fuel reformation cylinder 2A is calculated as a ratio between the capacity of the fuel reformation chamber 23 at the timing at which the intake valve 26 of the fuel reformation cylinder 2A is opened and the capacity of the fuel reformation chamber 23 at the timing at which the piston 22 reaches the compression top dead center.

The compression end gas temperature of the fuel reformation cylinder 2A can be adjusted by changing the above-described effective compression ratio. The "compression end gas temperature" denotes the temperature of an air-fuel mixture in a state where the air-fuel mixture formed with the fuel injected from the injector 25 has a smallest capacity of the reformation cylinder because of the piston 22.

Specifically, the effective compression ratio is adjusted by adjusting opening and closing timings of the intake valve 26 using the above-described variable valve unit 28. The compression end gas temperature can be raised by adjusting the effective compression ratio to a higher value and can be lowered by adjusting the effective compression ratio to a lower value. A reformation reaction is promoted by raising the compression end gas temperature and the first reformed gas temperature can rise accordingly. The first reformed gas temperature can be made to fall by lowering the compression end gas temperature. The variable valve unit 28 can employ a conventionally known type that changes a cam phase, a type that changes a cam lift, an electromagnetic drive type valve unit, or the like and is not limited to the variable valve unit type.

The first reformed gas temperature adjustment mechanism according to a third variation includes a variable valve unit 29. With the variable valve unit 29, the expansion ratio of the fuel reformation cylinder 2A can be adjusted. Specifically, the expansion ratio can be adjusted by adjusting opening and closing timings of the exhaust valve 27 using the variable valve unit 29. The expansion ratio of the fuel reformation cylinder 2A can be calculated as a ratio between the capacity at a timing at which the exhaust valve 27 is opened in an expansion stroke in the fuel reformation cylinder 2A and the capacity of the fuel reformation chamber 23 at a timing at which the piston 22 of the fuel reformation chamber 23 reaches the compression top dead center. Thus, the expansion ratio can be lowered by advancing an opening timing of the exhaust valve 27 in an expansion stroke, and can be raised by bringing an opening timing of the exhaust valve 27 in an expansion stroke closer to the bottom dead center. The temperature of the first reformed gas discharged from the fuel reformation cylinder 2A can be raised by lowering the expansion ratio, and the temperature of the first reformed gas can be lowered by raising the expansion ratio.

It is preferable that the above-described first reformed gas temperature adjustment mechanism undergo feedback control based on the temperature of the introduction gas detected by the introduction gas temperature detector 101. Parameters including feedback gain at the time of the feedback control are set through experiments, simulations, and the like as suitable.

Another variation of the above-described introduction gas temperature adjustment mechanism is described with reference to FIG. 3. The introduction gas temperature adjustment mechanism of this variation includes a first heat exchanger 200, the fuel reformation unit EGR passage 71, an exhaust gas flow rate adjustment valve 71B, and the introduction gas temperature detector 101. The first heat exchanger 200 is arranged on the first reformed gas passage 51. The fuel reformation unit EGR passage 71 allows the exhaust gas discharged from the output cylinder 3 to flow to the first heat exchanger 200. The exhaust gas flow rate adjustment valve 71B adjusts the flow rate of the exhaust gas flowing through the fuel reformation unit EGR passage 71. The introduction gas temperature detector 101 detects the temperature of the introduction gas introduced to the fuel reformation catalyst 2B. As illustrated in FIG. 1, the fuel reformation unit EGR passage 71 is connected to the fuel reformation cylinder EGR passage 72 and the fuel reformation catalyst EGR passage 73.

Figure 3:
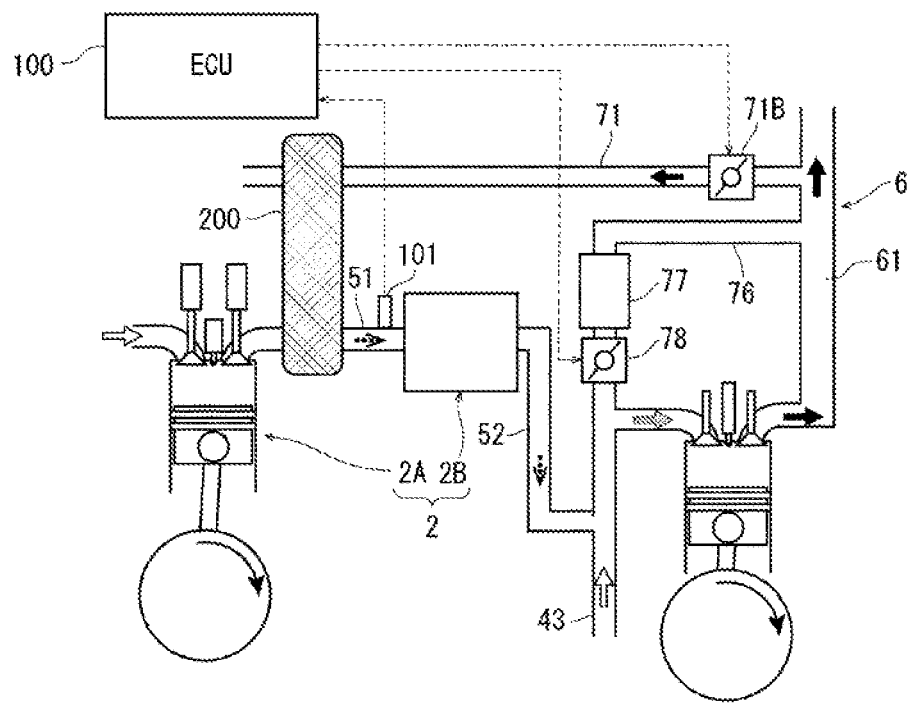
FIG. 3 A partial extraction diagram of the internal combustion engine, which illustrates an arrangement structure of a first heat exchanger according to another variation of the introduction gas temperature adjustment mechanism illustrated in FIG. 1.

As illustrated in FIG. 3, high temperature exhaust gas is introduced from the exhaust passage 61 to the first heat exchanger 200 through the fuel reformation unit EGR passage 71. The first heat exchanger 200 transmits the heat of the exhaust gas to the first reformed gas flowing through the first reformed gas passage 51 and raises the temperature of the first reformed gas. The exhaust gas flowing through the first heat exchanger 200 can be increased by enlarging the opening degree of the exhaust gas flow rate adjustment valve 71B. The temperature of the first reformed gas flowing through the first reformed gas passage 51 can be further raised by increasing the exhaust gas flowing through the first heat exchanger 200. It is preferable that the opening degree of the above-described exhaust gas flow rate adjustment valve 71B undergo feedback control based on the temperature of the introduction gas detected by the introduction gas temperature detector 101. Parameters including feedback gain at the time of the feedback control are set through experiments, simulations, and the like as suitable. With this structure, the temperature of the first reformed gas can be adjusted without exerting any effect on the gas ingredients in the first reformed gas discharged from the fuel reformation cylinder 2A. The fuel reformation unit EGR passage 71 in the present variation serves as an "exhaust gas communication passage".

The present invention is not limited to the above-described variations but may include more different variations. Other variations are described below.

Figure 4:
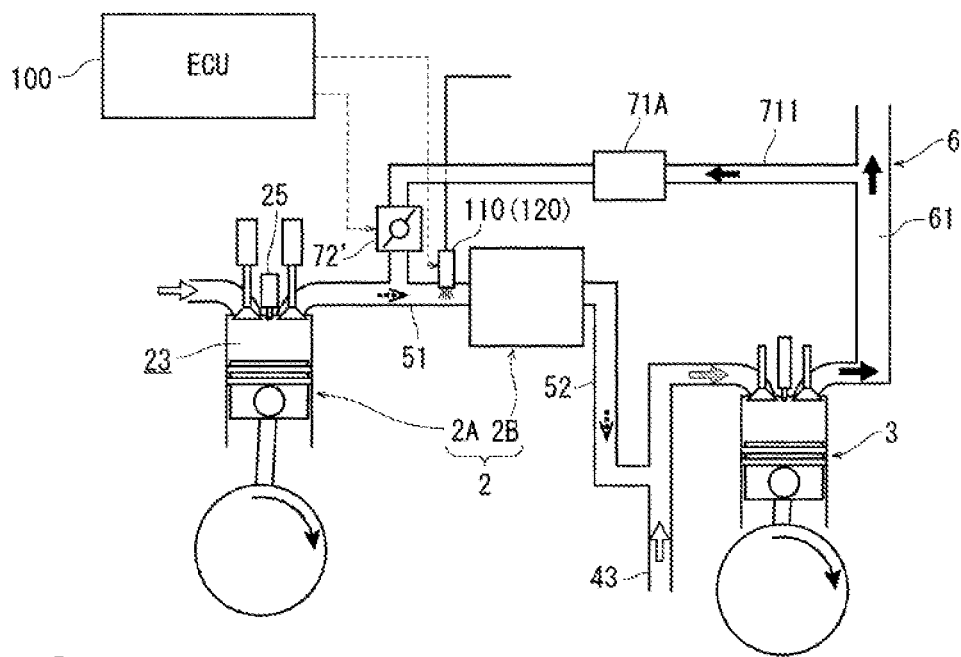
FIG. 4 A partial extraction diagram of the internal combustion engine, which illustrates an arrangement structure of an equivalence ratio adjustment mechanism and a water supply mechanism according to a variation of the embodiment illustrated in FIG. 1.

In the variation illustrated in FIG. 4, the fuel reformation unit 2 includes an equivalence ratio adjustment mechanism that supplies fuel to the first reformed gas passage 51 and adjusts the equivalence ratio of the gas introduced to the fuel reformation catalyst 2B. The equivalence ratio adjustment mechanism includes an additional fuel injector 110. The additional fuel injector 110 is provided on the first reformed gas passage 51. The amount of the fuel supplied from the additional fuel injector 110 is controlled according to a control signal of the ECU 100.

For example, in the case of high intensity of the engine, use of only the fuel reformation cylinder 2A may lead to unsuccessful generation of part of the fuel gas to be supplied to the output cylinder 3. In this case, the insufficient part of the fuel gas to be supplied to the output cylinder 3 can be filled by additionally supplying the fuel to the fuel reformation catalyst 2B using the additional fuel injector 110.

Further, as described above, even if an over-enriched air-fuel mixture high in equivalence ratio is introduced to the fuel reformation cylinder 2A to cause a reformation reaction, fuel containing higher hydrocarbons may remain in the first reformed gas instead of being fully reformed in the fuel reformation cylinder 2A. This can appear clearly in high intensity operation that needs a large amount of fuel to be supplied to the output cylinder 3. Thus, the amount of the fuel to be supplied from the injector 25 of the fuel reformation cylinder 2A into the fuel reformation chamber 23, which is included in the fuel to be supplied to the fuel reformation unit 2 and calculated according to the operational state of the engine, is kept to the fuel amount that enables the fuel to be favorably reformed in the fuel reformation cylinder 2A. The fuel that is left after subtracting the amount of the fuel to be supplied into the fuel reformation chamber 23 from the amount of the fuel to be supplied to the fuel reformation unit 2 is injected from the additional fuel injector 110. The fuel added from the additional fuel injector 110 and the first reformed gas that have failed to be fully reformed in the fuel reformation cylinder 2A and contains higher hydrocarbons are reformed through the fuel reformation catalyst 2B. Accordingly, the fuel gas favorable in quality and sufficient in amount can be supplied to the output cylinder 3.

As described above, the additional fuel injector 110 adjusts the equivalence ratio of the gas introduced to the fuel reformation catalyst 2B by additionally supplying the fuel to the first reformed gas passage 51.

Still another variation is described with reference to FIG. 4. As presented in Expression 2 below, a water vapor reformation reaction is caused in the fuel reformation catalyst 2B. Through the water vapor reformation reaction, various hydrocarbons different in number of carbon atoms are changed into $H_2$ and CO.

[Mathematical Expression 2]

$$C_nH_m + nH_2O \rightarrow nCO + \left(\frac{m}{2} + n\right)H_2 \qquad (2)$$

An example of the reaction through which the ratio between CO and $H_2$ is changed using the reformation reaction of the fuel reformation catalyst 2B is a water gas shift reaction, which is presented by Expression 3 below.

[Mathematical Expression 3]

$$CO + H_2O \leftrightarrows CO_2 + H_2 \qquad (3)$$

The ratio among $H_2$, CO, and lower hydrocarbon (such as methane), which are principal reformed gas ingredients in the second reformed gas discharged from the fuel reformation catalyst 2B can be adjusted as desired by suitably combining the reformation reactions presented by Expressions 2 and 3 above.

As a means to achieve the reformation reactions presented by Expressions 2 and 3 above, a water supply mechanism constituted by a water injector 120 is provided in an inlet portion of the fuel reformation catalyst 2B on the first reformed gas passage 51. Predetermined water is supplied from the water injector 120 to the fuel reformation catalyst 2B according to the ratio among the reformed gas ingredients desired according to the operational state.

If the water is injected from the above-described water injector 120, an unillustrated water tank may be added to the internal combustion engine 1 and the water may be supplied regularly. It is, however, more preferable that a condensed water collection mechanism be provided to take out the water vapor contained in the exhaust gas by arranging an exhaust gas cooling unit on the channel of the exhaust passage 61. By allowing the condensed water to be stored in the water tank, the necessity to supply water can be obviated.

Figure 5:
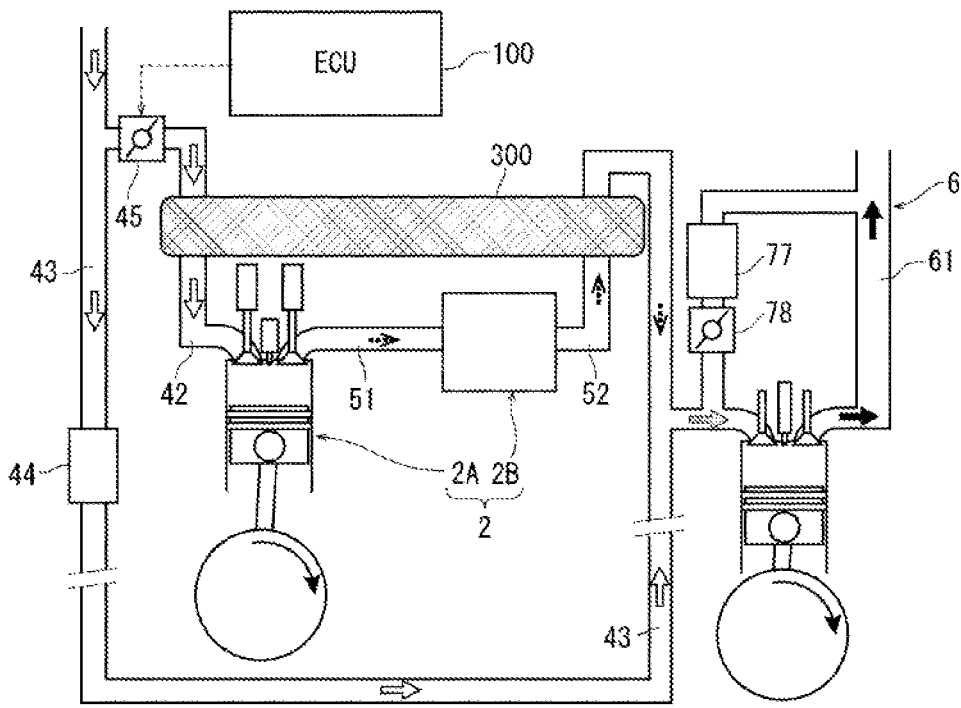
FIG. 5 A partial extraction diagram of the internal combustion engine, which illustrates an arrangement structure of a second heat exchanger according to another variation of the introduction gas temperature adjustment mechanism illustrated in FIG. 1.

Still another variation is described with reference to FIG. 5. In the variation illustrated in FIG. 5, the fuel reformation unit 2 includes a second heat exchanger 300 through which introduction gas to be introduced to the fuel reformation cylinder 2A and the second reformed gas discharged from the fuel reformation catalyst 2B flow. Through heat exchange between the introduction gas and the second reformed gas, the second heat exchanger 300 raises the temperature of the gas introduced to the fuel reformation cylinder 2A while cooling the second reformed gas.

As described above, a reaction in the fuel reformation catalyst 2B is caused at a high temperature (of 600 K or higher). Thus, in the embodiment illustrated in FIG. 1, the second reformed gas discharged from the fuel reformation catalyst 2B is cooled by the reformed gas cooler 53. In the present variation, while the temperature of the gas to be introduced to the fuel reformation cylinder 2A is raised using the thermal energy that the second reformed gas has, the second reformed gas is cooled.

With the above-described second heat exchanger 300, the compression end gas temperature of the fuel reformation cylinder 2A can be raised by supplying the heat of the second reformed gas to the gas to be introduced to the fuel reformation cylinder 2A and raising its temperature, and high reformation efficiency can be attained even with a high equivalence ratio. Accordingly, the reaction heat of the fuel reformation catalyst 2B can be recovered and this heat recovery contributes to increase in the efficiency of the entire system of the internal combustion engine 1.

Although the variations are described individually in the foregoing embodiment, the present invention is not limited to the variations established in the internal combustion engine 1 as being independent of each other but may allow the variations to be established concurrently.

Although the mechanism that adjusts the inlet temperature of the fuel reformation cylinder 2A, the mechanism that adjusts the effective compression ratio of the fuel reformation cylinder 2A, and the mechanism that adjusts the expansion ratio of the fuel reformation cylinder 2A are described individually as examples of the first reformed gas temperature adjustment mechanism, these mechanisms may be combined as needed so that the temperature of the first reformed gas can be adjusted.

Although the structure in which the additional fuel injector 110 is arranged on the above-described first reformed gas passage 51 and additional fuel is supplied to the fuel reformation catalyst 2B and the structure in which the water injector 120 is arranged on the first reformed gas passage 51 and water is supplied to the fuel reformation catalyst 2B are also described individually, these can be adopted concurrently as a matter of course.

As for the above-described first heat exchanger 200 and second heat exchanger 300, too, concurrent adoption is possible and these are not limited to being individually provided.

Although the internal combustion engine 1 of the above-described embodiment is described as an internal combustion engine applied to a stationary generator, the present invention is not limited to this but includes other applications, such as uses for ships, vehicles, and the like.

REFERENCE SIGNS LIST 1 internal combustion engine
2 fuel reformation unit
2A fuel reformation cylinder (first fuel reformer)
2B fuel reformation catalyst (second fuel reformer)
3 output cylinder
4 intake system
5 reformed fuel supply system
6 exhaust system
7 EGR system
11 crankshaft
21, 31 cylinder
22, 32 piston
41 main intake passage
42 fuel reformation cylinder intake passage
43 output cylinder intake passage
44 intake cooler
46 fuel reformation catalyst intake passage (supplemental air introduction passage)
47 outside air introduction amount adjustment valve
51 first reformed gas passage (reformed gas passage)
71 fuel reformation unit EGR passage (exhaust gas communication passage)
73 fuel reformation catalyst EGR passage (supplemental air introduction passage)
74 EGR gas amount adjustment valve
75 fuel reformation catalyst EGR gas amount adjustment valve
100 ECU
101 introduction gas temperature detector
110 additional fuel injector
120 water injector (water supply mechanism)
200 first heat exchanger
300 second heat exchanger

The invention claimed is:

1. An internal combustion engine comprising:
a fuel reformation unit including:
a first fuel reformer configured to receive a first fuel with a first octane rating and discharge a second fuel with a second octane rating, the second octane rating higher than the first octane rating, the first fuel reformer including a reciprocal mechanism, the reciprocal mechanism including a piston configured to reciprocate in a cylinder,
a second fuel reformer that includes a reformation catalyst,
a reformed gas passage configured to connect the first fuel reformer and the second fuel reformer together, the second fuel reformer configured to receive the second fuel from the first fuel reformer via the reformed gas passage; and
a heat exchanger configured to define a portion of a flow path, the flow path including:
a first input of the heat exchanger to the first fuel reformer; and
the second fuel reformer to a second input of the heat exchanger, the second input of the heat exchanger different from the first input of the heat exchanger; and
wherein an output cylinder of the internal combustion engine is configured to receive a third fuel, the third fuel discharged from the second fuel reformer.

2. The internal combustion engine according to claim 1, wherein the fuel reformation unit further includes a supplemental air introduction passage, the reformed gas passage configured to receive at least one of outside air and exhaust via the output cylinder.

3. The internal combustion engine according to claim 2, wherein the fuel reformation unit further includes:
an introduction gas temperature detector configured to detect a temperature of introduction gas introduced to the second fuel reformer,
an introduction gas temperature adjustment mechanism configured to adjust the temperature of the introduction gas introduced to the second fuel reformer, and
a controller configured to control the introduction gas temperature adjustment mechanism according to the temperature of the introduction gas detected by the introduction gas temperature detector.

4. The internal combustion engine according to claim 3, wherein:

the introduction gas temperature adjustment mechanism includes a second fuel temperature adjustment mechanism configured to adjust a temperature of the second fuel, and the controller is configured to control the second fuel temperature adjustment mechanism based on each of the detected temperature of the introduction gas and a threshold temperature.

5. The internal combustion engine according to claim 1, wherein the fuel reformation unit further includes an equivalence ratio adjustment mechanism configured to supply fuel to the reformed gas passage and adjust an equivalence ratio of the second fuel to be introduced to the second fuel reformer.

6. The internal combustion engine according to claim 1, wherein the fuel reformation unit further includes a water supply mechanism configured to supply water to the reformed gas passage.

7. The internal combustion engine according to claim 1, wherein the first fuel received by the first fuel reformer is different from the third fuel received by the output cylinder.

8. The internal combustion engine according to claim 1, wherein the second fuel is different from the third fuel.

9. The internal combustion engine according to claim 1, wherein the flow path further includes:

the first input of the heat, exchanger to a first output of the heat exchanger; and the second input of the heat exchanger to a second output of the heat exchanger.

10. The internal combustion engine according to claim 1, wherein the flow path further includes:

a first output of the heat exchanger to an input of the first fuel reformer;

an output of the first fuel reformer to an input of the second fuel reformer; and an output of the second fuel reformer to the second input of the heat exchanger.

11. The internal combustion engine according to claim 1, wherein the reformed gas passage defines a second portion of the flow path, the second portion of the flow path including an output of the first fuel reformer to an input of the second fuel reformer.

12. The internal combustion engine according to claim 11, wherein the fuel reformation unit includes a second reformed gas passage.

13. The internal combustion engine according to claim 12, wherein the second reformed gas passage defines a third portion of the flow path from an output of the second fuel reformer to the second input of the heat exchanger.

14. The internal combustion engine according to claim 1, wherein the heat exchanger is configured to increase a temperature of the first fuel to be received by the first fuel reformer.

15. The internal combustion engine according to claim 1, wherein the heat exchanger is configured to decrease a temperature of the third fuel to be received by the output cylinder.

16. The internal combustion engine according to claim 1, wherein the third fuel includes a third octane rating.

17. The internal combustion engine according to claim 16, wherein the third octane rating is greater than the first octane rating.

18. The internal combustion engine according to claim 16, wherein the third octane rating is greater than the second octane rating.

* * * * *